United States Patent
Calabuig Gaspar et al.

(10) Patent No.: US 10,455,367 B2
(45) Date of Patent: Oct. 22, 2019

(54) METHODS, TELEMATICS SERVER AND BASE STATION FOR SUPPORTING VEHICULAR COMMUNICATIONS IN A CELLULAR NETWORK

(71) Applicant: Bayerische Motoren Werke Aktiengesellschaft, Munich (DE)

(72) Inventors: Jordi Calabuig Gaspar, Valencia (ES); Daniel Calabuig Soler, Valencia (ES); Jose Francisco Monserrat Del Rio, Valencia (ES); David Gozalvez Serrano, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/497,265

(22) Filed: Apr. 26, 2017

(65) Prior Publication Data

US 2017/0230803 A1 Aug. 10, 2017

Related U.S. Application Data

(63) Continuation of application No. PCT/EP2014/073223, filed on Oct. 29, 2014.

(51) Int. Cl.
*H04W 40/20* (2009.01)
*H04W 4/04* (2009.01)
(Continued)

(52) U.S. Cl.
CPC ............ *H04W 4/046* (2013.01); *H04L 67/12* (2013.01); *H04W 4/12* (2013.01); *H04W 40/20* (2013.01); *H04W 84/042* (2013.01); *H04W 88/08* (2013.01)

(58) Field of Classification Search
CPC ...... H04W 4/046; H04W 40/20; G08G 1/162; H04L 67/12
See application file for complete search history.

(56) References Cited

U.S. PATENT DOCUMENTS

2007/0004437 A1* 1/2007 Harada .................. H04L 5/023
455/506
2012/0106551 A1 5/2012 Yousefi et al.
(Continued)

FOREIGN PATENT DOCUMENTS

WO WO 2009/155969 A1 12/2009
WO WO 2014/117810 A1 8/2014

OTHER PUBLICATIONS

ETSI Technical Report, "Intelligent Transport Systems (ITS); Framework for Public Mobile Networks in Cooperative ITS (C-ITS)", ETSI TR 102 962 V1.1.1 (Feb. 2012), pp. 1-63. (https://www.etsi.org/deliver/etsi_tr/102900_102999/102962/01.01.01_60/tr_102962v010101p.pdf) (Year: 2012).*
(Continued)

*Primary Examiner* — Allahyar Kasraian
(74) *Attorney, Agent, or Firm* — Crowell & Moring LLP

(57) ABSTRACT

A method for supporting vehicular communications in a cellular network includes analyzing whether an incoming message is a vehicle data message or a base station control message. In the case that the incoming message is a base station control message of a specific base station: updating and/or storing the network operating parameters of the specific base station for controlling a transmission of selected vehicle data messages to the specific base station. In the case that the incoming message is a vehicle data message of a sending vehicle, determining at least one destination vehicle out of a provided and/or stored list of registered vehicles participating in the vehicular communication. The method also includes transmitting the vehicle data message
(Continued)

to the at least one destination vehicle dependent on the at least one operating parameter of a respective receiving base station the at least one destination vehicle is connected to.

13 Claims, 3 Drawing Sheets

(51) Int. Cl.
*H04L 29/08* (2006.01)
*H04W 4/12* (2009.01)
*H04W 84/04* (2009.01)
*H04W 88/08* (2009.01)

(56) References Cited

U.S. PATENT DOCUMENTS

| | | | | |
|---|---|---|---|---|
| 2012/0268295 | A1* | 10/2012 | Yuse | G08G 1/0104 340/905 |
| 2013/0223450 | A1* | 8/2013 | Kamiya | H04L 1/18 370/392 |
| 2013/0325940 | A1* | 12/2013 | Foti | H04W 4/046 709/204 |
| 2014/0215491 | A1* | 7/2014 | Addepalli | H04W 4/046 719/313 |
| 2015/0189615 | A1* | 7/2015 | Rembarz | H04W 4/021 455/435.1 |
| 2015/0326462 | A1* | 11/2015 | Le | H04L 43/0894 370/252 |
| 2016/0285960 | A1* | 9/2016 | Jodlauk | H04W 4/02 |

OTHER PUBLICATIONS

Cover page of EP 2 332 348 A1 published Jun. 15, 2011 (one (1) page).
D. Bhaskar et al., "Secured Geocast Routing in VANET (Vehicular Ad-Hoc Network) with Two Stage Efficient Communication Protocol," International Journal of Computer Applications, Sep. 25, 2012, pp. 34-38, vol. 53, No. 12, XP055081870.
International Search Report (PCT/ISA/210) issued in PCT Application No. PCT/EP2014/073223 dated Aug. 5, 2015 (six (6) pages).
Written Opinion (PCT/ISA/237) issued in PCT Application No. PCT/EP2014/073223 dated Aug. 5, 2015 (fourteen (14) pages).

* cited by examiner

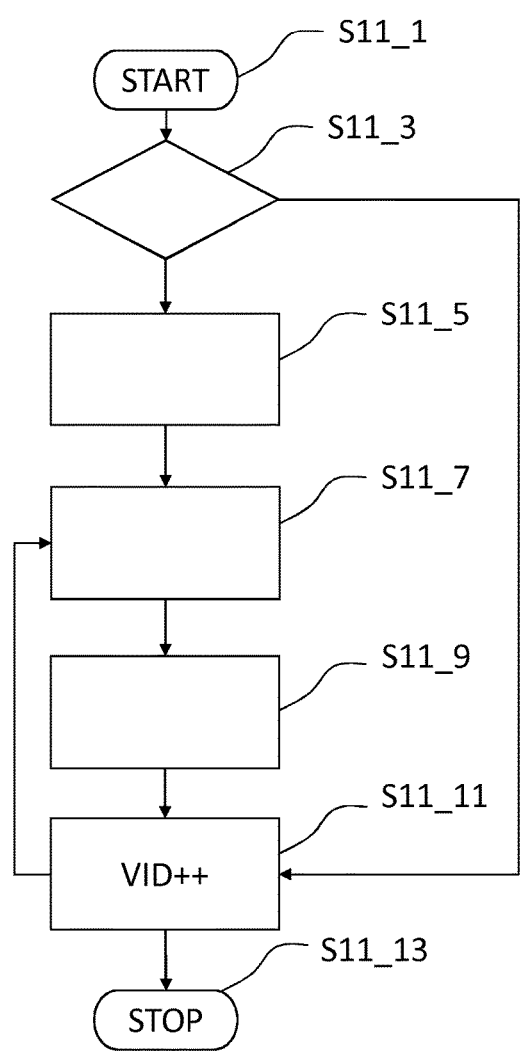

METHODS, TELEMATICS SERVER AND BASE STATION FOR SUPPORTING VEHICULAR COMMUNICATIONS IN A CELLULAR NETWORK

CROSS REFERENCE TO RELATED APPLICATION

This application is a continuation of PCT International Application No. PCT/EP2014/073223, filed Oct. 29, 2014, the entire disclosure of which is herein expressly incorporated by reference.

BACKGROUND AND SUMMARY OF THE INVENTION

The embodiments of the invention relate to a method and a telematics server for supporting vehicular communications in a cellular network. Furthermore, the embodiments of the invention relate to an additional method and a base station for supporting vehicular communications in a cellular network. The embodiments of the invention relate further to computer program and computer program product for supporting vehicular communications in a cellular network.

Intelligent Transportation Systems (ITS) are advanced applications which aim at providing innovative services relating to different modes of transport and traffic management. Intelligent Transportation Systems enable road safety applications based on wireless communications in order to reduce the risk of car accidents. These safety applications can be further divided into two types: those associated with Cooperative Awareness (CA) and those associated with Road Hazard Warnings (RHWs). Based on the ETSI standards (ETSI TS 102,637-2, V1.2.1 and ETSI TS 102,637-3, V1.1.1), there are two types of messages for active road safety: Cooperative Awareness Message (CAM) for CA applications and event-triggered Decentralized Environmental Notification Message (DENM) for RHW applications.

CA applications are based on the periodic interchange of status data among neighboring vehicles. In this case, CAMs are used to exchange information of presence, position, as well as basic status. By receiving CAMs, a vehicle can be aware of the presence of other vehicles in its surroundings as well as their positions, movement, basic attributes and basic sensor information.

A major challenge of supporting CA applications in a cellular network is the congestion caused by frequent transmission of CAMs, typically once every 100 ms, by a large number of traffic participants. This is especially critical in dense areas, like city centers and/or during peak hours.

WO 2014/117810 A1 disclose a method for supporting vehicular communication in a cellular-based communication system. A packet transmission rate adjustment procedure is performed, in which the following steps are recursively executed: measuring one or more parameters related to packet transmission characteristics, by a control entity, based on the results of the measurements, determining an optimal packet transmission rate, wherein said vehicles and said control entity transmit packets by applying said optimal packet transmission rate.

The objects of the invention include providing a method and a corresponding telematics server for supporting vehicular communications in a cellular network as well as an additional method and a base station for supporting vehicular communications in a cellular network, which contribute to improving the provisioning quality of vehicle data messages.

SUMMARY

This and other objects are achieved by a method and a corresponding telematics server for supporting vehicular communications in a cellular network. The cellular network comprises a given quantity of base stations and a plurality of vehicles. The vehicles each comprise a mobile device for transmitting vehicular related messages to the respective base station of the cellular network the vehicles is connected to. It is analyzed if an incoming message is a vehicle data message or a base station control message, wherein the base station control message comprises at least one given network operating parameter captured and/or determined by the base station providing the respective base station control message. In the case that the incoming message is a base station control message of a specific base station, the at least one network operating parameter of the specific base station is updated and/or stored for controlling a transmission of selected vehicle data messages to the specific base station. In the case that the incoming message is a vehicle data message of a sending vehicle, at least one destination vehicle out of a provided and/or stored list of registered vehicles participating in the vehicular communication is determined and the vehicle data message is transmitted to the at least one destination vehicle dependent on the at least one operating parameter of a respective receiving base station the at least one destination vehicle is connected to.

The particular advantage of this is that it allows a very precise aggregation of the vehicle data messages and/or transmission rate adaption and/or a controlling of a buffering of the vehicle data messages for the destination vehicle, in particular by the telematics server, because the base station is configured to measure and/or capture and/or determine and/or estimate very precisely the at least one network operating parameter. As normally more than one destination vehicle are connected to each base station, the additional data traffic which has to be sent to the telematics server can be minimized. It is not necessary that the vehicles send additional data burdening, in particular, a cell capacity of the base stations. In comparison to a procedure where only an optimal transmission rate of packets is determined an efficiency of the cellular network can be increased. The base stations can provide additional information, which cannot be accurately derived by means of end- to-end measurements of the vehicles and the telematics server, such as the radio resource utilization in each cell or an optimum transport block size at a radio level. Furthermore, the measurements and/or determinations with regard to a cellular network performance executed by the cellular network, in particular by the base stations, may be more up-to-date than measurements provided by the vehicles and the telematics server, which might comprise outdated or unreliable information.

Advantageously, cellular communication networks are widespread and a great installed base exists already. In particular, Long Term Evolution (LIE) is a suited access technology to support communications in vehicular environments compared, for example, to ITS based on the IEEE 802.11p standard, because of good levels of quality in terms of throughput, latency and in particular quality of service.

The telematics server may comprise an ITS server. The ITS server receives vehicle data messages from the vehicles and a traffic infrastructure, processes the information, and redistributes it to the vehicles and the traffic infrastructure.

The vehicle data message may comprise a Cooperative Awareness Message.

The vehicle being connected to the base station means that the vehicle comprises a mobile device configured to communicate with the base station and that the vehicle is located within coverage area of the base station.

The at least one network operating parameter represents an optimum transport block size for the respective vehicles transmitting vehicle data messages in a cell of the base station providing the at least one network operating parameter and/or an estimated radio delay in downlink and/or a congestion status and/or a time stamp of the base station which provides the at least one network operating parameter.

Based on this information, the telematics server may optimize the delivery processing for each destination vehicle. Preferably, the base stations periodically send the base station control messages to the telematics server. These control messages may include, for all vehicles transmitting vehicle data messages in the cell, their optimum transport block size based on the radio access channel quality for each vehicle. Moreover, the base station may inform the telematics server about the estimated radio access delay in downlink, i.e. a time elapsed from a reception of one packet in the base station until its delivery to the destination vehicle, and the congestion status measured in terms of resource consumption. The base station control messages may include time stamps, with which the telematics server could also measure an IP network delay from the telematics server to the base station. This IP network delay plus the radio access delay yields an estimate of the time it takes for a data packet to be transmitted from the telematics server to the destination vehicle (total delay). This is very advantageous because in general an uplink delay and latency budget from different vehicles belonging to different operators is unknown and therefore packets do not reach a backend server in a synchronized way.

The at least one destination vehicle for which the vehicle data message might be relevant is determined dependent on a provided and/or stored geomessaging information of the respective base stations. The particular advantage of this is that it allows a more precise filtering of the vehicle data messages for their transmission through cellular networks. The geomessaging information allows to determine, at least approximately, the geo-position of potential destination vehicles.

The geo-messaging information of the respective base station comprises a list of vehicles connected to the respective base station and/or a position of the respective base station and/or a coverage area of the respective base station and/or an optimum packet size to be delivered to the connected vehicles. This allows to reduce the computational burden of the telematics server, as filtering can be easily applied thanks to the grouping of vehicles served by the same base station or its neighbors. Thus, it is possible to transmit the respective vehicle data message in an easy way to a set of nodes satisfying a certain geographical criterion. Because of the geomessaging information such as the list of vehicles connected to each base station, the position of each base station and the coverage area, the list of vehicles potentially interested is reduced, thereby making this analysis manageable.

The geo-messaging information is provided by the base stations by including the respective geo-messaging information into the base station control messages. In this way, the geomessaging information can be easily kept up-to-date. For example, the base station control messages are sent on a regular basis and the geomessaging information of the respective base station is updated and/or stored. Furthermore important location information known by the cellular network such as cell positions and cell coverage areas to divide the geographical area of interest and location updates have not to be transmitted by the connected vehicles.

The vehicle data message for the at least one destination vehicle is provided at a given interface. The interface comprises a buffer for each registered vehicle. The vehicle data message for the respective destination vehicle is buffered in the buffer of the respective destination vehicle. This allows a very flexible buffering and/or aggregation of the vehicle data messages and/or transmission rate adaption for the destination vehicle. The buffer, for instance, comprises a first-in-first out buffer.

An aggregated vehicle data message for a specific destination vehicle is formed by a concatenation of several vehicle data messages of the specific destination vehicle in the dedicated buffer of the specific destination vehicle. This increases the efficiency of the cellular network as, because of the aggregation, less protocol overhead has to be transmitted. The aggregation of different vehicle data messages allows a more efficient use of transport blocks. In comparison, for instance, to a procedure where only an optimal transmission rate of packets is determined, the efficiency of the cellular network can be increased. The aggregation can be used to optimize a final packet size according to multiple parameters such as the optimum transport block size at the radio level or latency requirements.

The sending of a single vehicle data message or the aggregated vehicle data message to the destination vehicle depends on a given timing constraint. This increases the efficiency of the cellular network as compared to the case in which aggregation is performed periodically. This can be translated in a reduction in the number of network resources required for the transmission of the vehicle data messages while keeping quality of service (QoS) requirements for ITS applications. The collaboration of the base station allows for an accurate knowledge of the specific conditions of the destination vehicle from the radio point of view, rendering the filtering and aggregation process dynamic and user-specific. In particular, a radio access channel quality can condition the aggregation.

The given timing constraint represents a given deadline by which the vehicle data message has to reach the destination vehicle and/or an optimum packet data size of the destination vehicle reported by the receiving base station. Based on this information, the telematics server can optimize the delivery processing for each destination vehicle.

A relevance indicator for the respective vehicle data message related to the respective destination vehicle is determined and the transmission and/or buffering of the vehicle data message for the respective destination vehicle depends on the relevance indicator. In this way the telematics server may perform, for instance in the event of congestion in the radio access network, a refined selection of most relevant vehicle data messages to each vehicle in order to limit the amount of information that is transmitted and to reduce the network load. In comparison, for instance, to the procedure where only an optimal transmission rate of packets is determined an efficiency of the cellular network can be increased because of the possibility to drop packets dependent on their relevance.

The relevance indicator represents a distance between the sending vehicle and the respective destination vehicle. This allows to easily determine the relevance indicator.

Additionally, the embodiment of the invention are distinguished by a method and a corresponding base station for supporting vehicular communications in a cellular network. The cellular network comprises a plurality of vehicles. The vehicles each comprise a mobile device for transmitting vehicular related messages to a given telematics server via a base station they are connected to. It is checked whether a received message is a given vehicle data message or not. In the case the incoming message is the vehicle data message determining a given source identifier of the respective vehicle, which sent the vehicle data message, and a given target identifier of the telematics server, where the sending vehicle sending the data message is registered, is determined. Furthermore at least one network operating parameter is captured and/or determined, and, in given time intervals, a base station control message to the telematics server is sent, wherein the base station control message comprises the at least one network operating parameter.

The collaboration of the base station allows for an accurate knowledge of the specific conditions of the destination vehicle from the radio point of view, rendering the filtering and aggregation process of the vehicle data message dynamic and user specific.

The source identifier and the target identifier may be an Internet Protocol, IP, address. Preferably the telematics services will be conveyed within specific radio access bearers with the required characteristics of quality of service, so that the base station could identify the source and destination IP addresses of the vehicular data messages and, therefore, know the serving telematics server and a valid identifier for each vehicle. With this information, the base station may inform the telematics server about data related to the network operating parameter and/or geomessaging information.

The at least one network operating parameter may represent an optimum transport block size for the respective vehicles transmitting vehicle data messages in a cell of the base station and/or an estimated radio delay in downlink and/or a congestion status and/or a time stamp of the base station.

The base station determines a geomessaging information of the base station and includes the geomessaging information into the base station control message. The geomessaging information may comprise a list of vehicles connected to the base station and/or a position of the base station and/or a coverage area of the base station and/or an optimum packet size to be delivered to the connected vehicles.

Further, the embodiments of the invention are distinguished by a computer program, wherein the computer program is designed to execute the method for supporting vehicular communications in a cellular network according to the first or third aspect or to an advantageous embodiment of the methods by its execution on a data processing device.

Additionally, the embodiments of the invention are distinguished by a computer program product including executable program code, wherein the program code executes the method for supporting vehicular communications in a cellular network according to the first or third aspect or to an advantageous embodiment of the methods by its execution on a data processing device.

The computer program product comprises, in particular, a means which is readable by the data processing device and on which the program code is stored.

Other objects, advantages and novel features of the embodiments of the present invention will become apparent from the following detailed description of one or more preferred embodiments when considered in conjunction with the accompanying drawings.

BRIEF DESCRIPTION OF THE DRAWINGS

FIG. 3 is a flow chart of a second program.

DETAILED DESCRIPTION OF THE DRAWINGS

Figure 1:
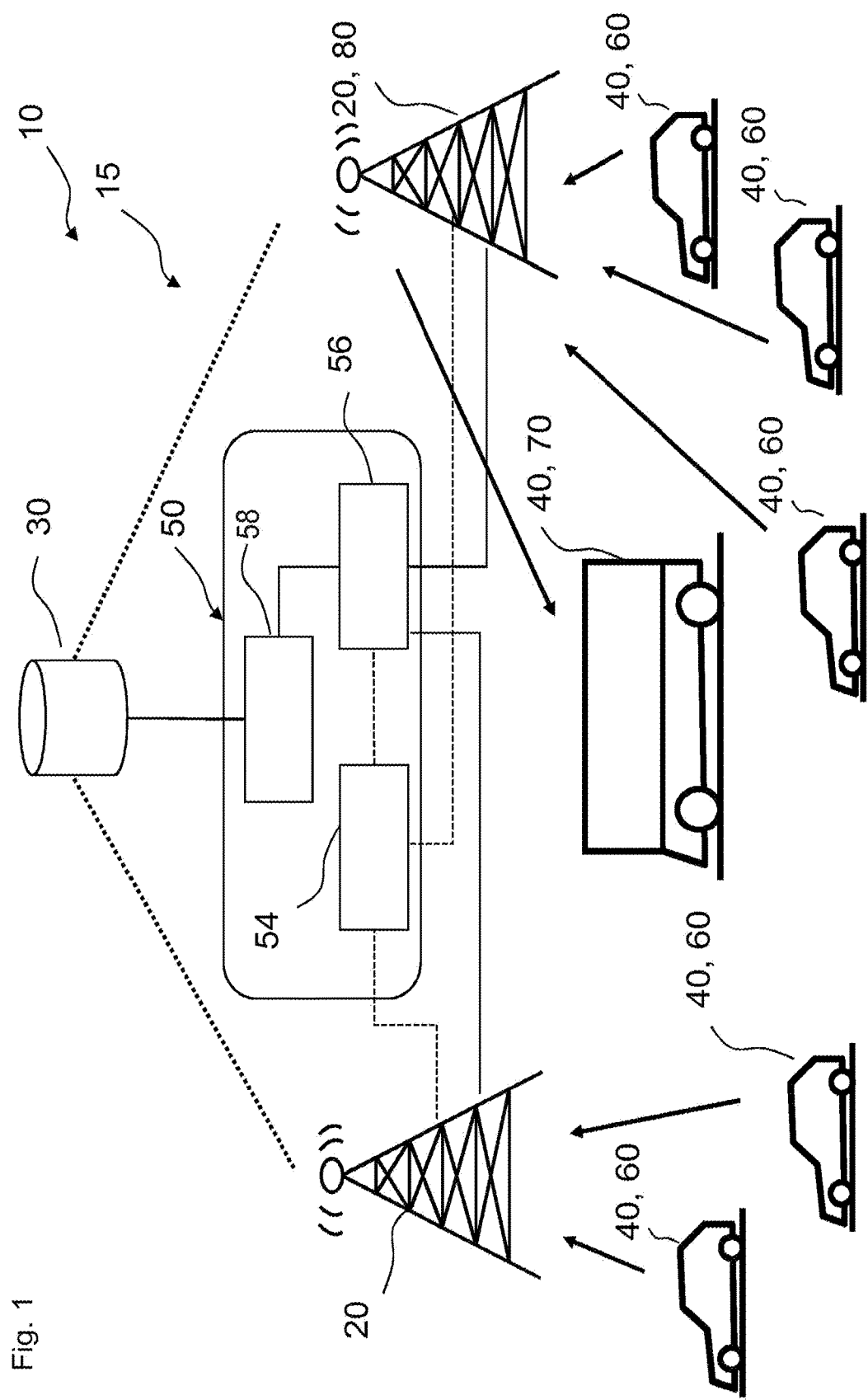
FIG. 1 is a schematic block diagram depicting an application scenario of vehicular communications in a cellular network.

FIG. 1 shows a schematic block diagram depicting an application scenario of vehicular communications in a cellular network 15.

FIG. 1 shows a communication system 10 comprising a telematics server 30, in particular an ITS (Intelligent Transport System) server, and the cellular network 15.

The cellular network 15 is relevant for embodiments herein and may correspond, but is not limited, to an LIE (Long Term Evolution) type of mobile cellular communications networks. In fact, it is possible to apply the embodiments of the invention in any other mobile cellular communications network, for instance UMTS networks.

The cellular network 15 comprises a given quantity of base stations 20 and a plurality of vehicles 40 each comprising a mobile device for transmitting messages to the respective base station 20 the mobile device is connected to.

Furthermore the cellular network 15 comprises a core network 50. The base stations 20 are coupled with the core network 50. For instance, the core network 50 comprises a Mobility Management Entity (MME) 54, a Serving Gateway (SGW) 56 and PDNGateway (P-GW) 58. For data transmission the base stations 20 are coupled with the Service Gateway 56.

In FIG. 1 dotted lines are shown, which represent signaling paths.

The respective base station 20 is configured to provide base station control messages and to send the base station control messages to the telematics server 30, for instance via the Service Gateway 56 and PDN-Gateway 58.

For supporting vehicular communications in a cellular network 15, the base station 20 is configured to check whether a received message is a given vehicle data message from a connected vehicle 40 or not. In the case that the incoming message is the vehicle data message, the base station 20 determines a given source identifier of the respective sending vehicle 60 which sent the vehicle data message and a given target identifier of the telematics server 30 where the sending vehicle 60 sending the data message is registered. The base station 20 is further configured to capture and/or determine at least one network operating parameter and to send, in given time intervals, the base station control message to the telematics server 30, wherein the base station control message comprises the at least one network operating parameter.

Preferably, the base station 20 periodically sends the base station control messages to the telematics server 30.

Optionally the base station 20 is configured to determine a given geomessaging information of the base station 20 and to send the geomessaging information to the telematics server 30, in particular, by including the geomessaging information into the base station control message.

The geomessaging information may comprise a list of vehicles 40 connected to the base station 20 and/or a position of the base station 20 and/or a coverage area of the base station 20 and/or an optimum packet size to be delivered to the connected vehicles 40.

The telematics server 30 is, for example, located on the inter net, which means that the telematics server 30 might be reached via an internet connection. Alternatively the telematics server 30 may be located in the core network 50 or in an access network.

The assignment of a specific vehicle to the telematics server 30 may, for instance, be dependent on a current geoposition of the specific vehicle. The telematics server 30, for example, comprises a list of registered vehicles 40 participating in the vehicular communication. For example, the telematics server 30 is configured to handle the vehicle data messages of vehicles 40 in a big city. The vehicles 40 will subscribe to the service in the same telematics server 30 that will distribute relevant and filtered information to each vehicle 40 participating in the vehicular communication.

The telematics server 30 is, for instance, configured to filter the vehicle data messages depending on a geolocalization of the involved vehicles 40.

Preferably, the telematics server 30 is configured to use a GeoMessaging function.

According ETSI specifications (ETSI TR 102 962, V1.1.1) the GeoMessaging function allows CAMs to be distributed only to destination vehicles 70 inside a given geographical area. According to a possible implementation, a geographical area of interest is covered by a number of smaller areas. Vehicles 40 entering a new area register themselves when they cross over to a new area and the server informs them about the coordinates of the new geographical area. In this manner, the telematics server 30 knows at any moment which vehicles 40 are in each area together with their IP addresses. The area size can vary from application to application, thus affecting the amount of signaling overhead. By following this procedure, the telematics server 30 is able to distinguish between areas when sending CAMs in the downlink by means of unicast links.

The telematics server 30 comprises, for instance, a public IP address and is reachable for all mobile network operators. In order to reduce a latency, each telematics server 30 may be regional-wide, with a limited set of route hops up to the gateways of the mobile networks.

The telematics server 30 receives the vehicle data messages and 15 the base station control messages from different base stations 20.

The telematics server 30 is configured to analyze whether an incoming message is a vehicle data message or a base station control message.

Based on this information, the telematics server 30 is configured to optimize the delivery processing for each destination vehicle 70.

Optionally the telematics server 30 comprises a given interface for transmitting the vehicle data messages to the respective destination vehicles 70. The interface, for instance, comprises a buffer for each registered vehicle 40. The vehicle data message for the respective destination vehicle 70 is buffered in the buffer of the respective destination vehicle 70.

Figure 2:
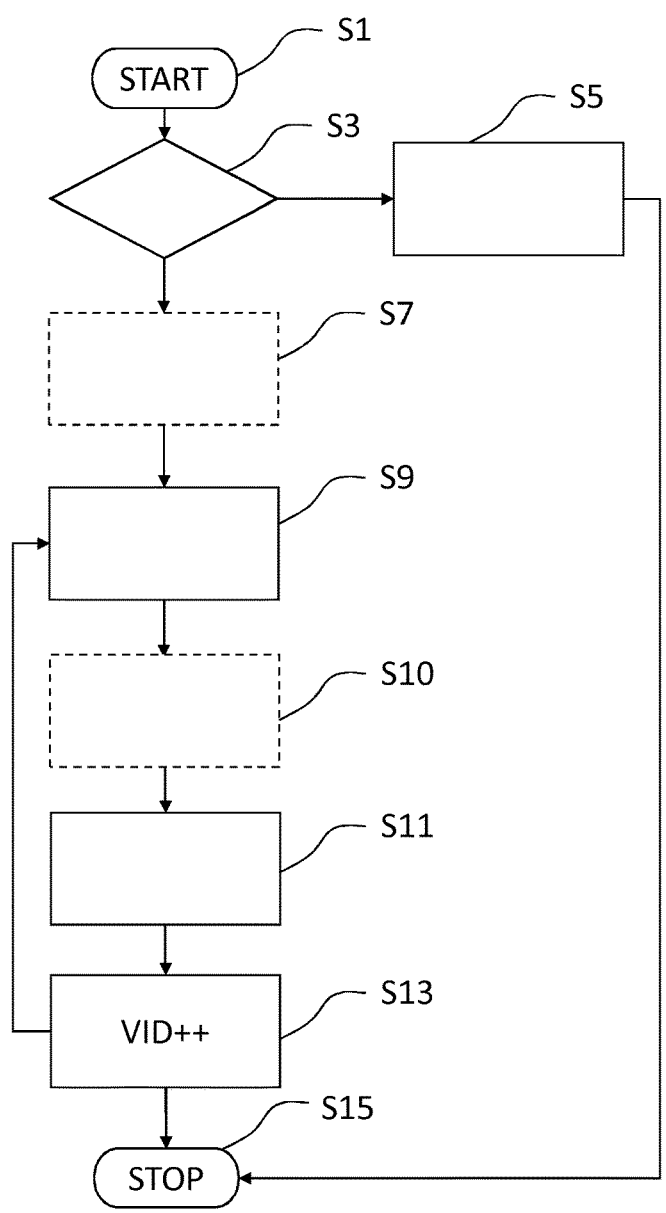
FIG. 2 is a flow chart of a first program.

FIG. 2 shows a flow chart of a first program for supporting vehicular communications in a cellular network 15.

The first program can for example be executed in the telematics server 30. The first program starts in a step S1, in which variables can be initialized.

In a step S3 it is analyzed if an incoming message is a vehicle data message or a base station control message.

In the case that the incoming message is a base station control message of a specific base station, in a step 5 the at least one network operating parameter of the specific base station is updated and/or stored. The at least one network operating parameter is used for controlling a transmission of selected vehicle data messages to the specific base station.

In the case that the incoming message is a vehicle data message of a sending vehicle 60, optionally, in a step S7 a position and/or a speed and/or a direction of the sending vehicle 60 and/or its associated base station 20 is updated.

In the case that the incoming message is the vehicle data message in a step S9 (in conjunction with loop S13) at least one destination vehicle 70 out of a provided and/or stored list of registered vehicles 40 participating in the vehicular communication is determined and in a step S11 the vehicle data message is transmitted to the at least one destination vehicle 70 dependent on the at least one operating parameter of a respective receiving base station 80 the at least one destination vehicle 70 is connected to.

For instance, the at least one destination vehicle 70 for which the vehicle data message might be relevant is determined dependent on a provided and/or stored geomessaging information of the respective base stations 20.

The geomessaging information of the respective base station 20 comprises a list of vehicles 40 connected to the respective base station 20 and/or a position of the respective base station 20 and/or a coverage area of the respective base station 20 and/or an optimum packet size to be delivered to the connected vehicles 40.

Preferably, the vehicle data messages are buffered before they are sent to the respective destination base station 20.

For instance, an aggregated vehicle data message for each destination vehicle 70 is formed by a concatenation of several vehicle data messages of the respective destination vehicle 70 in the dedicated buffer.

Optionally, a relevance indicator for the respective vehicle data message related to the respective destination vehicle 70 may be determined in a step 10. A relevance of the vehicle data message depends, for instance, on the distance between the two vehicles 60, 70. The relevance indicator represents, for example, a distance between the sending vehicle 60 and the respective destination vehicle 70: the closer they are, the more relevant the vehicle data message is. In a step 11 the vehicle data message is stored together with the relevance indicator. FIG. 3 shows a flow chart of a second program.

The second program can be used as a subprogram of the first program exemplarily implementing the transmitting procedure of step S11 of the first program. The second program starts with a step S11 I, in which variables can be initialized.

In a step S11_3 (in conjunction with loop S11_11) it is analyzed if the vehicle data messages have to be transmitted to a specific vehicle. Optionally the relevance indicator can be used to analyze whether the vehicle data messages have to be transmitted to the specific vehicle.

If the vehicle data message is relevant for the respective destination vehicle 70 and should be sent, in a step S11_7 the most urgent vehicle data messages are selected with regard to the congestion status of the respective receiving base station 80.

Thus, the sending of a single vehicle data message or the aggregated vehicle data message to the destination vehicle 70 may depend on a given timing constraint. The given timing constraint may represent a given deadline by which the vehicle data message has to reach the destination vehicle

70 and/or an optimum packet data size of the destination vehicle 70 reported by the receiving base station 80.

Additionally or alternatively, the transmission and/or buffering of the vehicle data message for the respective destination vehicle 70 are selected dependent on the relevance indicator.

In this context, after transmitting the vehicle data messages, the buffer of the destination vehicle 70 is reset in a step S119.

Preferably, this process is executed periodically for each vehicle 40 registered in the telematics server 30. It is responsible for deciding whether an aggregated vehicle data message, formed by the concatenation of several vehicle data messages in the buffer, must be delivered to the destination vehicle 70 or whether the transmission can be delayed to the next decision step. In order to make this decision, the telematics server 30 may take into account the time stamp of the oldest vehicle data message in the packet buffer and the total delay the packet needs to reach the destination. It may also take into account the optimum packet data unit size of the destination vehicle 70 reported by the base station 20. If the optimum size is reached or the delay budget analysis indicates that the information must be delivered already in order to not become obsolete, the relevant vehicle data messages stored in the buffer are concatenated and the resulting message is transmitted in the downlink.

In case of congestion in the radio access network, the telematics server 30 may make a refined selection of most relevant vehicle data messages to each destination vehicle 70 in order to limit the amount of information that is transmitted and to reduce the network load.

REFERENCE NUMERALS

10 communication system
15 cellular network
20 base station
30 telematics server
40 vehicle
50 core network
54 Mobility Management Entity
56 Serving Gateway
58 PDN-Gateway
60 sending vehicle
70 destination vehicle
80 receiving base station
s1, . . . processing steps
S15

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for supporting vehicular communications in a cellular network, the cellular network comprising a given quantity of base stations and a plurality of vehicles each comprising a mobile device for transmitting vehicular related messages to respective base stations of the cellular network the vehicles are connected to, wherein the method comprises:

analyzing whether an incoming message is a vehicle data message or a base station control message, wherein the base station control message comprises at least one given network operating parameter captured and/or determined by a base station providing the base station control message;

in case that the incoming message is a base station control message of a specific base station: updating and/or storing the at least one given network operating parameter of the specific base station for controlling a transmission of selected vehicle data messages to the specific base station;

in case that the incoming message is a vehicle data message of a sending vehicle:

determining at least one destination vehicle out of a provided and/or stored list of registered vehicles participating in the vehicular communication; and transmitting the vehicle data message to the at least one destination vehicle dependent on the at least one operating parameter of a respective receiving base station the at least one destination vehicle is connected to.

2. The method according to claim 1, wherein the at least one network operating parameter represents an optimum transport block size for the respective vehicles transmitting vehicle data messages in a cell of the base station providing the at least one network operating parameter and/or an estimated radio delay in downlink and/or a congestion status and/or a time stamp of the base station which provides the at least one network operating parameter.

3. The method according to claim 2, wherein the at least one destination vehicle for which the vehicle data message might be relevant is determined dependent on a provided and/or stored geo-messaging information of the respective base stations.

4. The method according to claim 3, wherein the geo-messaging information of the respective base station comprises a list of vehicles connected to the respective base station and/or a position of the respective base station and/or a coverage area of the respective base station and/or an optimum packet size to be delivered to the connected vehicles.

5. The method according to claim 4, wherein the geo-messaging information is provided by the base stations by including the respective geo-messaging information into the base station control messages.

6. The method according to claim 5, wherein the vehicle data message to the at least one destination vehicle is provided at a given interface, the interface comprising a buffer for each registered vehicle and the vehicle data message for the respective destination vehicle is buffered in the buffer of the respective destination vehicle.

7. The method according to claim 6, wherein an aggregated vehicle data message for a specific destination vehicle is formed by a concatenation of several vehicle data messages of the specific destination vehicle in the dedicated buffer of the specific destination vehicle.

8. The method according to claim 7, wherein the sending of a single vehicle data message or the aggregated vehicle data message to the destination vehicle depends on a given timing constraint.

9. The method according to claim 8, wherein the given timing constraint represents a given deadline by which the vehicle data message has to reach the destination vehicle and/or an optimum packet data size of the destination vehicle reported by the receiving base station.

10. The method according to claim 9, wherein a relevance indicator for the respective vehicle data message related to the respective destination vehicle is determined and the transmission and/or buffering of the vehicle data message for the respective destination vehicle depends on the relevance indicator.

11. The method according to claim 10, wherein the relevance indicator represents a distance between the sending vehicle and the respective destination vehicle.

12. A telematics server for supporting vehicular communications in a cellular network, wherein the telematics server is configured to execute the method according to claim 11.

13. A non-transitory computer readable storage medium storing instructions, which when executed cause the computer to perform the method according to claim 11.

* * * * *